US012670123B2

(12) United States Patent
    Michail et al.

(10) Patent No.: US 12,670,123 B2
(45) Date of Patent: Jun. 30, 2026

(54) HARDWARE ACCELERATOR WITH CONFIGURABLE TENSOR OPERATION PIPELINE

(71) Applicant: Microsoft Technology Licensing, LLC, Redmond, WA (US)

(72) Inventors: Ashraf Ayman Michail, Kirkland, WA (US); Li Zhang, Saratoga, CA (US); Nitin Naresh Garegrat, San Jose, CA (US); Thomas Craig Savell, Emeryville, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/769,220

(22) Filed: Jul. 10, 2024

(65)                 Prior Publication Data

US 2026/0017228 A1      Jan. 15, 2026

(51) Int. Cl.
    *G06F 15/80*        (2006.01)
    *G06F 9/38*         (2018.01)
    *G06F 15/78*        (2006.01)
    *G06F 15/82*        (2006.01)

(52) U.S. Cl.
    CPC ............ *G06F 15/80* (2013.01); *G06F 9/3869* (2013.01); *G06F 15/7889* (2013.01); *G06F 15/7892* (2013.01); *G06F 15/825* (2013.01); *G06F 15/7867* (2013.01); *G06F 15/7871* (2013.01)

(58) Field of Classification Search
    CPC .... G06F 15/80; G06F 9/3869; G06F 15/7889; G06F 15/7892; G06F 15/825; G06F 15/7867; G06F 15/7871
    See application file for complete search history.

(56)              References Cited

U.S. PATENT DOCUMENTS 10,817,344 B2 * 10/2020  Raz ........................ G06F 9/5072
    2019/0244085 A1    8/2019  Franca-Neto
    2021/0406437 A1 * 12/2021  Wu ..................... G06F 15/7889
                     (Continued)

OTHER PUBLICATIONS

International Search Report and Written Opinion received for PCT Application No. PCT/US2025/034401, mailed on Oct. 20, 2025, 14 Pages.
                     (Continued)

*Primary Examiner* — Corey S Faherty
(74) *Attorney, Agent, or Firm* — Holzer Patel Drennan

(57)              ABSTRACT

A hardware accelerator is disclosed that can flexibly be configured to support differing data types and differing operation flows. The hardware accelerator includes a plurality of fixed tensor operation logic units, tensor operation pipeline logic configured to receive from the processor a pipeline command including a software-defined tensor operation pipeline definition defining a plurality of tensor operation stages in a tensor operation pipeline and associated predetermined tensor operations to be performed at each of the defined tensor operation stages. The hardware accelerator is further configured to receive tensor data to be computed by the tensor operation pipeline, and implement the tensor operation pipeline to perform the tensor operations in each of the tensor operation stages on the tensor data, to thereby produce a tensor operation pipeline result for the tensor data, and output the tensor operation pipeline result to the processor.

19 Claims, 12 Drawing Sheets

(56)          References Cited

U.S. PATENT DOCUMENTS

| | | | |
|---|---|---|---|
| 2022/0350567 A1* | 11/2022 | Pan | G06F 7/5443 |
| 2023/0315410 A1* | 10/2023 | Yang | G06F 8/443 |
| | | | 717/151 |
| 2023/0385103 A1 | 11/2023 | Zheng | |
| 2023/0385230 A1* | 11/2023 | Desai | G06F 15/7867 |
| 2024/0070113 A1* | 2/2024 | Prabhakar | G06F 9/4881 |
| 2024/0338178 A1* | 10/2024 | Cherlapally | G06F 7/4983 |
| 2025/0053518 A1* | 2/2025 | Feldman | G06N 3/0464 |
| 2026/0017060 A1 | 1/2026 | Michail | |

OTHER PUBLICATIONS

International Search Report and Written Opinion received for PCT Application No. PCT/US2025/034405, mailed on Oct. 20, 2025, 13 Pages.

* cited by examiner

GENERIC TENSOR
OPERATION PIPELINE

TENSOR OPERATION
LOGIC UNITS

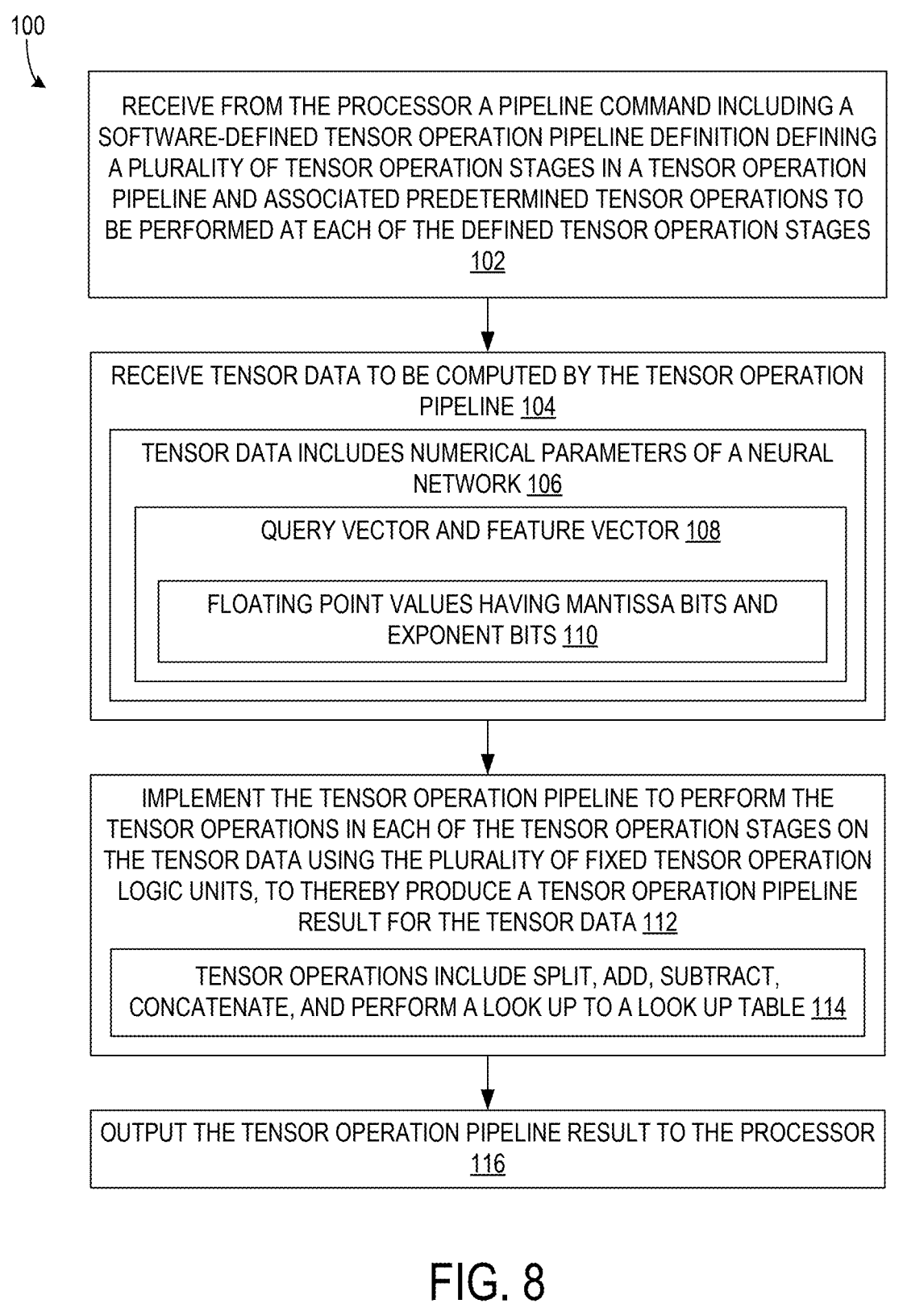

100

```
┌─────────────────────────────────────────────────────────────────┐
│   RECEIVE FROM THE PROCESSOR A PIPELINE COMMAND INCLUDING A       │
│ SOFTWARE-DEFINED TENSOR OPERATION PIPELINE DEFINITION DEFINING    │
│   A PLURALITY OF TENSOR OPERATION STAGES IN A TENSOR OPERATION    │
│  PIPELINE AND ASSOCIATED PREDETERMINED TENSOR OPERATIONS TO       │
│   BE PERFORMED AT EACH OF THE DEFINED TENSOR OPERATION STAGES     │
│                              102                                   │
└─────────────────────────────────────────────────────────────────┘
                               │
                               ▼
┌─────────────────────────────────────────────────────────────────┐
│   RECEIVE TENSOR DATA TO BE COMPUTED BY THE TENSOR OPERATION      │
│                        PIPELINE 104                                │
│ ┌───────────────────────────────────────────────────────────────┐│
│ │   TENSOR DATA INCLUDES NUMERICAL PARAMETERS OF A NEURAL        ││
│ │                      NETWORK 106                               ││
│ │ ┌─────────────────────────────────────────────────────────────┐││
│ │ │        QUERY VECTOR AND FEATURE VECTOR 108                  │││
│ │ │ ┌───────────────────────────────────────────────────────────┐│││
│ │ │ │   FLOATING POINT VALUES HAVING MANTISSA BITS AND         ││││
│ │ │ │              EXPONENT BITS 110                            ││││
│ │ │ └───────────────────────────────────────────────────────────┘│││
│ │ └─────────────────────────────────────────────────────────────┘││
│ └───────────────────────────────────────────────────────────────┘│
└─────────────────────────────────────────────────────────────────┘
                               │
                               ▼
┌─────────────────────────────────────────────────────────────────┐
│   IMPLEMENT THE TENSOR OPERATION PIPELINE TO PERFORM THE          │
│ TENSOR OPERATIONS IN EACH OF THE TENSOR OPERATION STAGES ON       │
│ THE TENSOR DATA USING THE PLURALITY OF FIXED TENSOR OPERATION     │
│ LOGIC UNITS, TO THEREBY PRODUCE A TENSOR OPERATION PIPELINE       │
│           RESULT FOR THE TENSOR DATA 112                          │
│ ┌───────────────────────────────────────────────────────────────┐│
│ │   TENSOR OPERATIONS INCLUDE SPLIT, ADD, SUBTRACT,              ││
│ │ CONCATENATE, AND PERFORM A LOOK UP TO A LOOK UP TABLE 114      ││
│ └───────────────────────────────────────────────────────────────┘│
└─────────────────────────────────────────────────────────────────┘
                               │
                               ▼
┌─────────────────────────────────────────────────────────────────┐
│ OUTPUT THE TENSOR OPERATION PIPELINE RESULT TO THE PROCESSOR      │
│                            116                                     │
└─────────────────────────────────────────────────────────────────┘
```

FIG. 8

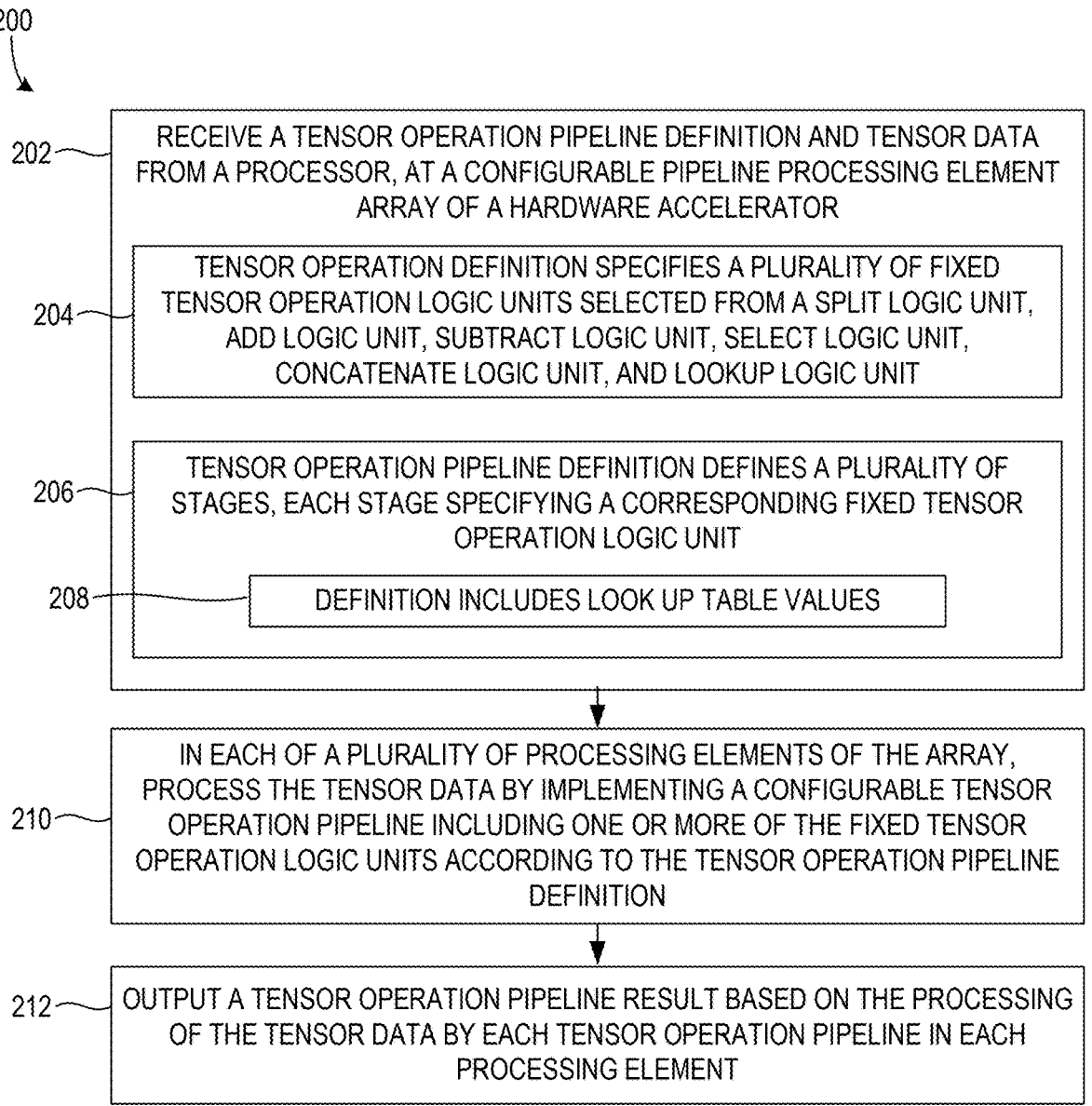

200

202 — RECEIVE A TENSOR OPERATION PIPELINE DEFINITION AND TENSOR DATA FROM A PROCESSOR, AT A CONFIGURABLE PIPELINE PROCESSING ELEMENT ARRAY OF A HARDWARE ACCELERATOR

204 — TENSOR OPERATION DEFINITION SPECIFIES A PLURALITY OF FIXED TENSOR OPERATION LOGIC UNITS SELECTED FROM A SPLIT LOGIC UNIT, ADD LOGIC UNIT, SUBTRACT LOGIC UNIT, SELECT LOGIC UNIT, CONCATENATE LOGIC UNIT, AND LOOKUP LOGIC UNIT

206 — TENSOR OPERATION PIPELINE DEFINITION DEFINES A PLURALITY OF STAGES, EACH STAGE SPECIFYING A CORRESPONDING FIXED TENSOR OPERATION LOGIC UNIT

208 — DEFINITION INCLUDES LOOK UP TABLE VALUES

210 — IN EACH OF A PLURALITY OF PROCESSING ELEMENTS OF THE ARRAY, PROCESS THE TENSOR DATA BY IMPLEMENTING A CONFIGURABLE TENSOR OPERATION PIPELINE INCLUDING ONE OR MORE OF THE FIXED TENSOR OPERATION LOGIC UNITS ACCORDING TO THE TENSOR OPERATION PIPELINE DEFINITION

212 — OUTPUT A TENSOR OPERATION PIPELINE RESULT BASED ON THE PROCESSING OF THE TENSOR DATA BY EACH TENSOR OPERATION PIPELINE IN EACH PROCESSING ELEMENT

FIG. 9

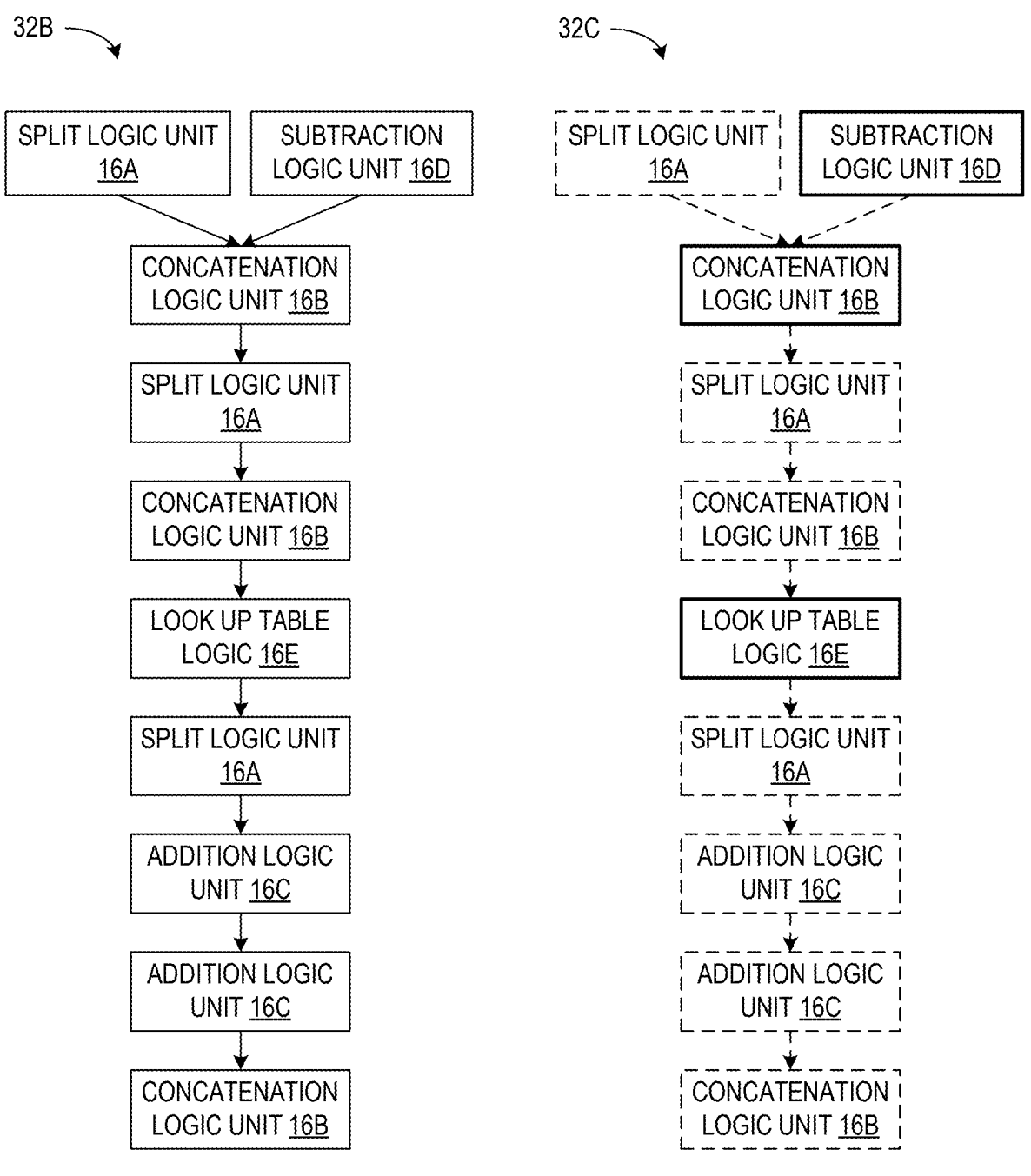
FIG. 10A                    FIG. 10B

Q: [32, 32] uint4
S: [32] s0e4m4
B: [32] uint4
X[i,j] = S[i]*(Q[i,j] - B[i])

SE, SM = split(S, 4)
SI, A = sub(Q, B, 1)
C = concat(A, SM, 1)
R = lookup(C, T)
E, M = spit(R, 4)
F = add(E, SE, 1)
OUT = concat(SI, F, M)

HARDWARE ACCELERATOR WITH CONFIGURABLE TENSOR OPERATION PIPELINE

BACKGROUND

Hardware accelerators used in artificial intelligence (AI) applications, such as tensor processing units (TPUs), are generally high-performance parallel computation machines that are specifically designed for the efficient processing of AI workloads such as computation of neural network parameters. Deep learning applications utilize neural networks made up of multiple layers and require processing vast amounts of data organized in multidimensional arrays referred to as tensors. In such applications, quantization or other optimization methods are used for reducing the size of the neural networks to decrease storage/memory size and computational cost. Quantization refers to techniques for performing computations and storing tensors at lower bit widths than their original floating point precision. For example, full precision values for weights and/or activations in a neural network can be quantized and substituted with lower precision, lower bit width representations of these values, which are more compact. A quantized AI model permits execution of some or all computations on tensors with reduced precision rather than full precision values, potentially achieving computational efficiency although at the potential cost of accuracy. Dequantization is the reverse process of quantization, namely, lower bit width representations of values are upconverted to higher precision representations. In conventional approaches, quantization or dequantization of model parameters are run by a CPU as separate processes from training or inference processes. For example, the model is first quantized, and then it is further trained or used in inference. Thus, the model is first be prepared in a preprocessing step to have weights that are in a precision and format accepted by the hardware accelerator.

Different data formats of the lower precision compact representations may be used and are generally defined by a hardware manufacturer's specifications. Such hardware generally requires specific input and output data formats for quantization, quantized tensor operation (e.g., math computation), and/or dequantization. Consequently, users of such hardware are limited to using the hardware manufacturer's specified/built-in input and output data format requirements in order to achieve peak performance of the manufacturer's hardware capabilities. This has the potential disadvantage that the preset data format requirements of the hardware accelerator may not meet the desires of the user for the user's particular AI application. Other acceleration devices, such as programmable graphics processing units, involve additional computation overhead, such as memory read/write overhead, and are thus unable to achieve the throughput for performing tensor operations that dedicated tensor processing units have achieved.

SUMMARY

To address the issues discussed herein, according to one aspect of the present disclosure, a hardware accelerator for use with a processor of a computing system is disclosed that can flexibly be configured to support differing data types and differing operation flows. According to a first aspect, the hardware accelerator includes a configurable pipeline processing element array including a plurality of processing elements. Each processing element includes a plurality of fixed tensor operation logic units. The configurable pipeline processing element array is configured to receive a tensor operation pipeline definition and tensor data from a processor. Each processing element processes the tensor data by implementing a configurable tensor operation pipeline including one or more of the fixed tensor operation logic units according to the tensor operation pipeline definition. The configurable pipeline processing element array outputs a tensor operation pipeline result based on the processing of the tensor data by each tensor operation pipeline in each processing element.

According to a second aspect, the hardware accelerator includes a plurality of fixed tensor operation logic units configured to perform a plurality of predetermined types of tensor operations. The hardware accelerator further includes tensor operation pipeline logic configured to receive from the processor a pipeline command including a software-defined tensor operation pipeline definition defining a plurality of tensor operation stages in a tensor operation pipeline and associated predetermined tensor operations to be performed at each of the defined tensor operation stages. The hardware accelerator is further configured to receive tensor data to be computed by the tensor operation pipeline, and implement the tensor operation pipeline to perform the tensor operations in each of the tensor operation stages on the tensor data, to thereby produce a tensor operation pipeline result for the tensor data. The hardware accelerator is further configured to output the tensor operation pipeline result.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a flowchart illustrating a computing method for utilizing a hardware accelerator with tensor operation logic units, according to one example of the present disclosure.

FIG. 9 is a flowchart illustrating a computing method according to another example of the present disclosure.

FIGS. 10A and 10B illustrate two example tensor operation pipelines that the hardware accelerator of the computing system of FIG. 1 can implement, the pipeline of FIG. 10B being constructed by specifying that no operation is performed by certain logic units of the pipeline of FIG. 10A.

DETAILED DESCRIPTION

Figure 1:
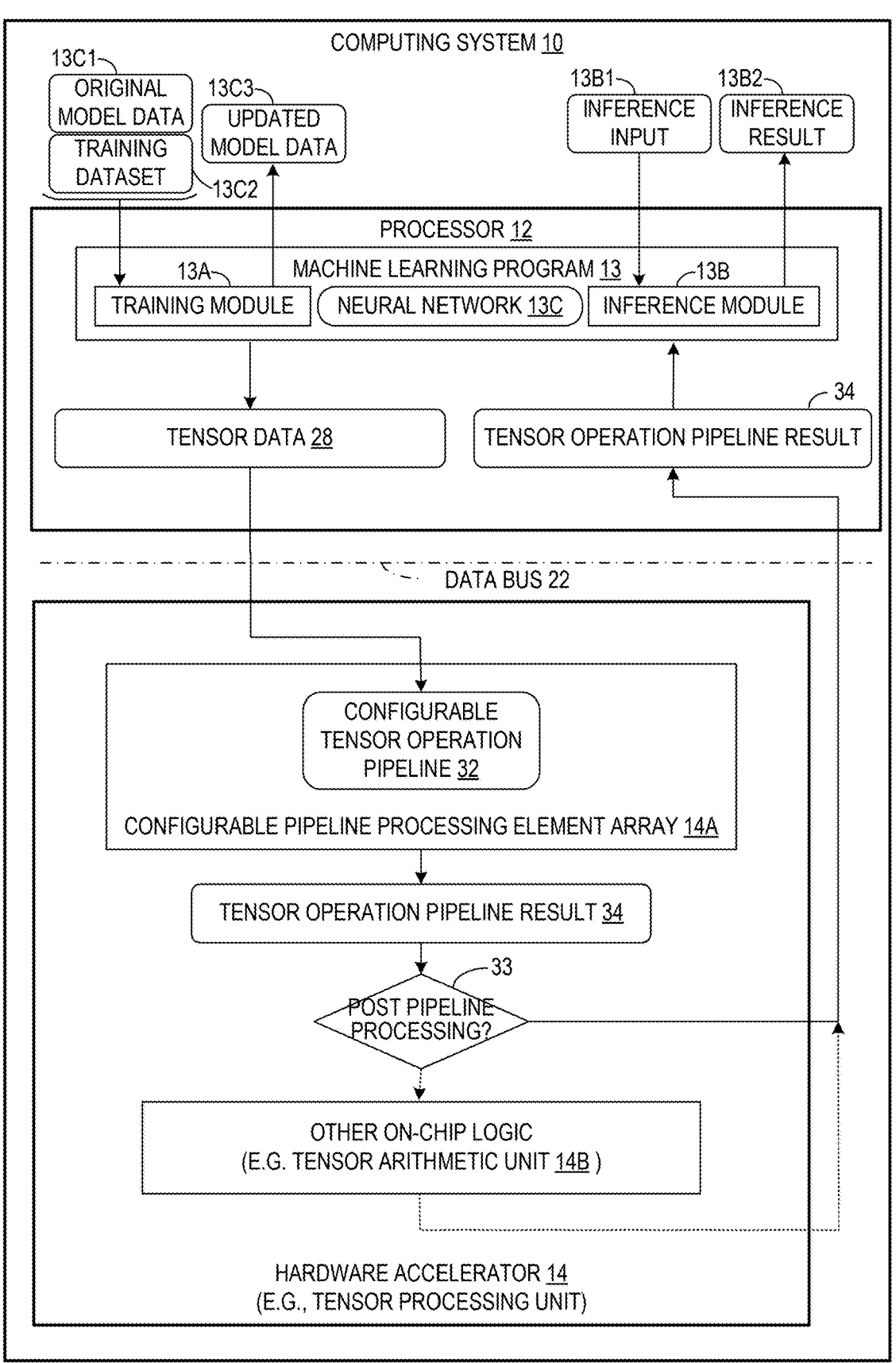
FIG. 1 shows a schematic view of a computing system with a hardware accelerator configured to process tensor data using a configurable tensor operation pipeline, according to an embodiment of the present disclosure.

The available hardware accelerators used in artificial intelligence (AI) applications, such as tensor processing units (TPUs), typically require specific input and output data formats defined by the manufacturer of such equipment. As a result, users of such hardware are limited to using the hardware manufacturer's specified input and output data format in order to achieve peak performance of the hardware. One way to use such hardware is to convert or reshape the data sets to conform with the hardware data format requirements. However, such preprocessing of the data sets adds to the time and cost of overall data processing. Alternatively, users may forego using such hardware in lieu of fully programmable hardware that may be configured for the user's particular needs. However, fully programmable hardware accelerators are generally slower and are generally not optimized for the very large data sets and tensor operations demanded of AI applications. Moreover, hardware product development can take longer than advances being made in the technologies involved with processing AI application data sets. For example, by the time users have access to a particular hardware accelerator product, it is possible that data science advances have been made whereby the particular data formats and limitations of the hardware are already out of date or obsolete. That is, advances in technologies and techniques for manipulating and operating on the very large data sets used in AI applications can outpace the development and commercial deployment of hardware and hardware accelerator products that are needed to support such advances in data processing techniques. This can lead to a situation in which cutting edge data science techniques are implemented on sub-optimal hardware.

Accordingly, a hardware accelerator that is more flexible and that is designed to provide a strategically limited set of fixed function tensor operation logic units, for example, in order to obtain peak performance and throughput from the hardware accelerator, is provided in the present description. The following description provides implementations of a flexible hardware accelerator that can support a range of tensor data operations, such as block scaling. As will be discussed in further detail, the hardware accelerator can include an array of M×K processing elements. Each processing element can be configured to operate on a pipeline that includes one or more of the following operations: split (e.g., providing an ability to split a floating point number into parts such as mantissa and exponent bits, with the split function being programmable by software); subtract (e.g., providing an ability to subtract integers or floating point numbers); select (e.g., choose one of two values depending on a condition); concatenate (e.g., concatenate two or more inputs together); add (e.g., an adder for adding two integers or floating point numbers); and lookup table (e.g., a software programmable lookup table whereby output of any of the above operations can be used to index into an n-entry lookup table). An exemplary lookup table can include a 256/512 entry 8 bit lookup table (LUT). The hardware accelerator can be configured to be numeric format agnostic, whereby software can, for example, change the numeric format for the quantization values for every tensor. Further, the hardware accelerator can be configured to efficiently implement programmable math operations (e.g., via values stored in one or more lookup tables).

As shown in FIG. 1, a computing system 10 is shown, including a processor 12 and hardware accelerator 14 specially configured for use with the processor 12 to perform certain repetitive, computationally intensive tasks involved in machine learning. For example, processor 12 can be configured to implement a machine learning program 13 that includes a training module 13A and an inference module 13B respectively configured to perform training and inference on a neural network 13C. Logically, neural network 13C includes multiple layers of artificial neurons connected by communication paths that have associated weights. The artificial neurons have activation functions that produce outputs to other artificial neurons based on inputs received at each artificial neuron. The training module 13A can be configured to adjust the weights of the connections according to a backpropagation algorithm during training, for example, to train the neural network 13C. The inference module 13B is configured to receive an inference input 13B1 and generate an inference output 13B2 using the trained neural network 13C.

To facilitate the efficient training of or inference by the neural network 13C, the original model data 13C1 defining the neural network 13C can be stored in tensors of predefined dimensions, and the hardware accelerator 14 can be configured to efficiently process these tensors by performing arithmetic operations on the tensors, using a tensor arithmetic unit 14B. Regarding nomenclature, since hardware accelerator 14 is configured to process tensor operations involved in computing neural network parameters used in artificial intelligence applications such as those described above, the hardware accelerator 14 alternatively can be referred to as a tensor processing unit, neural processing unit, or artificial intelligence accelerator, for example. Regarding physical chip architecture, in some implementations the processor 12 and hardware accelerator 14 may be incorporated into a System-on-Chip (SoC) and may communicate via a Network-on-Chip (NoC), direct memory access, on-chip data bus, inter-module interconnect, or other on-chip manner, and in other implementations the processor 12 and hardware accelerator 14 may be separate components that communicate by an interconnect such as a Peripheral Component Interconnect express (PCIe) interconnect or off-chip data bus. These two types of busses are generically indicated as data bus 22 in FIG. 1.

Tensor data 28 can contain, for example, the weights in each connection in the neural network 13C. The weights can be stored in tensor data 28 in a predefined original precision, such as 8-bit floating point (FP8) as shown in FIG. 1. Other original precisions and number type are also possible, such as 8-bit integer (INT8), 4-bit floating point (FP4), as a few examples. In addition, the tensor data 28 may contain other types of data, such as activations, or may be an encoded using an encoding scheme. Distribution encoding is one such example encoding scheme.

Figure 2:
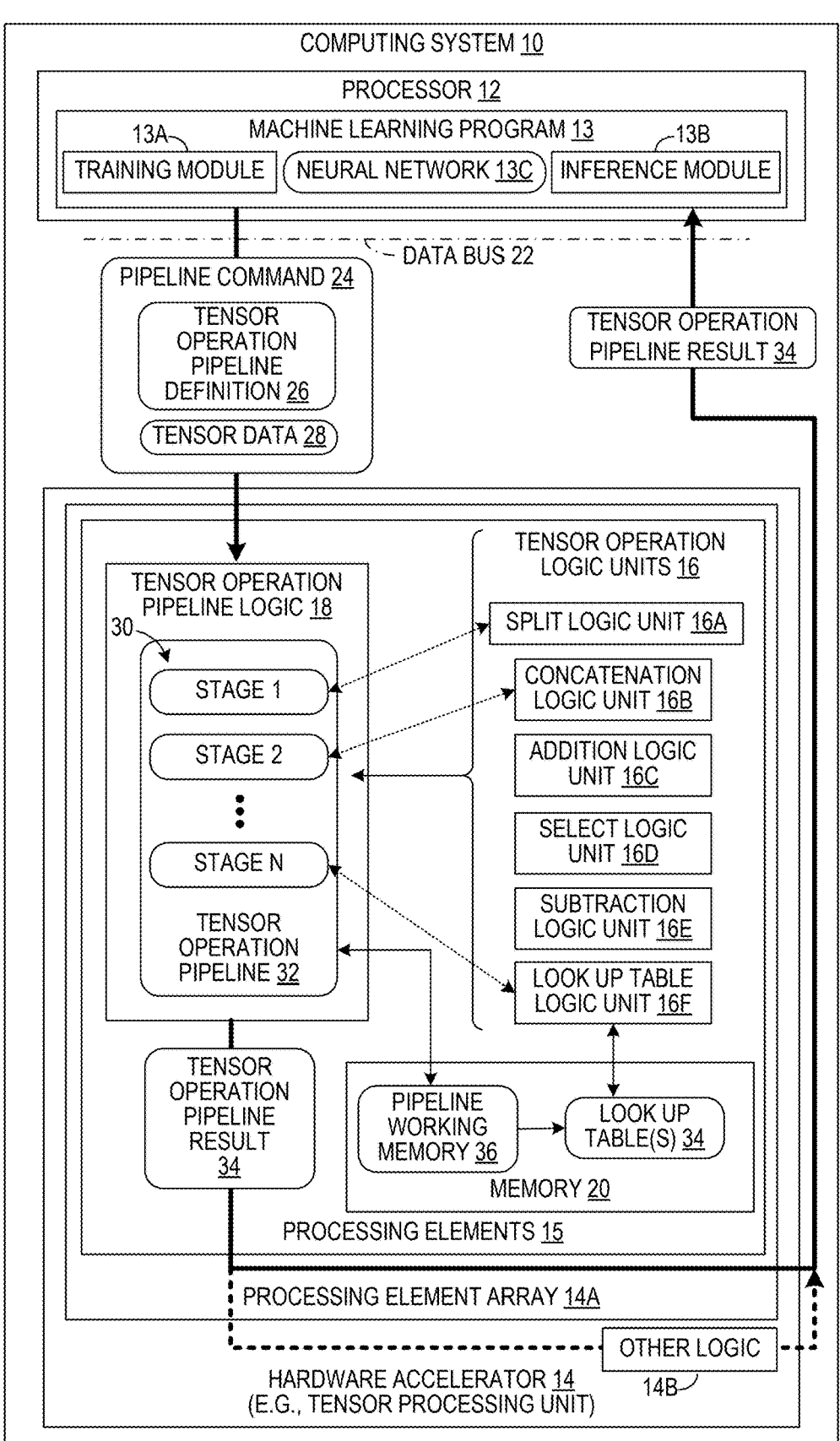
FIG. 2 shows a schematic view of the computing system of FIG. 1, illustrating tensor operation logic units that may be included in the configurable tensor operation pipeline of the hardware accelerator.

Since the tensor data 28 can come in a variety of formats and encodings, hardware accelerator 14 is provided with a configurable pipeline processing element array 14A that implements a configurable tensor operation pipeline 32 that can operate based on user-defined instructions (see pipeline command 24 in FIG. 2). Thus, the user can configure the hardware of hardware accelerator 14 to operate in a manner compatible with the format of the tensor data 28 and processing goals of a project. Specific examples are discussed below, including decoding tensor data that has been encoded using distribution encoding, and block scaling. Other examples also exist, such as quantization, dequantization, normalization, trigonometric functions, etc. The processing element array 14A outputs a tensor operation pipeline result 34. The hardware accelerator is configured to make a post pipeline processing decision 33 based on user instructions, regarding whether post pipeline processing is to be applied. The tensor operation pipeline result 34 can be directly outputted to the processor 12 (NO at Post Pipeline Processing decision 33), or can be output to other on-chip logic (YES at Post Pipeline Processing decision 33), such as a tensor arithmetic unit 14B, depending on the result of the decision 33. Examples of a tensor arithmetic unit include a systolic array configured for matrix-matrix multiply and accumulate operations. Processing element array 14A is a sequential array rather than a systolic array, which will be understood from the description below. In the case where other on-chip logic such as tensor arithmetic unit 14B processes the tensor operation pipeline result, the processed tensor operation pipeline result 34 is returned to the processor 12, as shown in dashed lines. Depending on the type of computations being performed, the processor 12 can receive the tensor operation pipeline result 34 and use it to update the updated model data 13C3 during training or generate the inference result 13B2 during inference, for example.

Turning now to FIG. 2, hardware accelerator 14 includes a plurality of processing elements 15 within processing element array 14A. Each of the processing elements 15 includes tensor operation logic units 16 and tensor operation pipeline logic 18. Tensor operation logic units 16 are separate and distinct hardware units from the hardware elements of tensor arithmetic unit 14B. Each processing element 15 of the hardware accelerator 14 further includes memory 20 configured to store data used by components within the processing element 15. Both the tensor operation logic units 16 and the tensor operation pipeline logic 18 are configured to read and write data to memory 20, as is tensor arithmetic unit 14B. Further, in one example implementation processor 12 can directly read from and write to register locations in memory 20, in order to perform input/output to/from the processing elements 15. Memory 20 is typically volatile memory such as RAM, and may be referred to as closely coupled memory.

The plurality of fixed tensor operation logic units 16 of each processing element 15 of hardware accelerator 14 are configured to perform a plurality of predetermined types of tensor operations. As some examples, tensor operation logic units 16 can include a split logic unit 16A configured to perform a split operation, a concatenation logic unit 16B configured to perform a concatenation operation, an addition logic unit 16C configured to perform an addition operation, a select logic unit 16D configured to select between two inputs according to a selection criterion or condition, a subtraction logic unit 16E configured to perform a subtraction operation, and a lookup table logic unit 16F and perform a lookup to a lookup table 34. The fixed tensor operation logic units 16 contain fixed logic circuits configured to perform each of these operations. The logic units are fixed because they are not programmable and exist as logic circuits in hardware, with the exception of the lookup table itself, which can be written to and read from and the values of which are programmable. While all of the tensor operation logic units 16 are present in each of the processing elements 15, the pipeline command can be used to turn off or disable certain of the logic units 16, and the remaining operational logic units according to the pipeline command form the tensor operation pipeline logic 16. While the internals of each fixed tensor operation logic unit are not programmable, the pipeline 32 itself is configurable to include a programmable order of the fixed tensor operation logic units. For example, the split logic unit 16A can be used to split a floating point number into a predetermined number of mantissa bits and a predetermined number of exponent bits. The predetermined number can be programmably set by a user, via the tensor operation pipeline definition 26. For example, an FP8 number can be split into 4 mantissa and 4 exponent bits, 5 mantissa bits and 3 exponent bits, 6 mantissa bits and 2 exponent bits, etc. Following the split, the concatenation logic unit 16B can be used to combine the mantissas of two inputs and combine the exponents of two inputs. These combined values can be used as indices to one or more lookup tables, for example, or passed to other logic units for additional arithmetic operations.

Thus, to flexibly accommodate tensor data 28 in a variety of formats and encodings, tensor operation pipeline logic 18 is configured to receive from the processor 12 via a data bus 22 or other communication mechanism such as direct memory writes accompanied by doorbells (e.g., 1-bit notifications of data waiting at a memory location), a pipeline command 24 including a software-defined tensor operation pipeline definition 26 defining a plurality of tensor operation stages 30 in a tensor operation pipeline 32 and associated predetermined tensor operations to be performed at each of the defined tensor operation stages 30 by the tensor operation logic units 16. The pipeline command 24 may further include tensor data 28, which is input data that is to be computed by the tensor operation pipeline 32. A variety of formats and encodings may be used for the tensor data. As one example, the tensor data 28 can take the form of two blocks of two matrices from which operands for the tensor operation are pulled, for example. The tensor data 28 is received by the tensor operation pipeline logic 18 of the hardware accelerator 14. The tensor data 28 and tensor operation pipeline 32 may be stored and manipulated by the tensor operation pipeline logic 18 in pipeline working memory 36 of memory 20.

The tensor operation pipeline logic 18 is configured to implement the tensor operation pipeline 32 to perform the tensor operations in each of the tensor operation stages 30 on the tensor data 28 using the tensor operation logic units 16, to thereby produce a tensor operation pipeline result 34 for the tensor data 28, and output the tensor operation pipeline result 34 to the processor 12. Alternatively, as shown in dashed lines, the tensor operation pipeline result 34 can be output to other logic such as the tensor arithmetic unit 14B, for post pipeline processing prior to returning the tensor operation processing pipeline result 34 to the processor 12.

As discussed above, the tensor data 28 can include numerical parameters of a neural network. The numerical parameters can be weights of nodes in the neural network, and activations (values for the activation function) of each node. In some implementations, these values may be encoded according to an encoding scheme, such as distribution encoding. The numerical parameters of the neural network can be represented as floating point values including one or more mantissa bits and one or more exponent bits. When the tensor data 28 includes floating point values, the split function is configured to split the floating point values into constituent mantissa and exponent portions, as discussed above.

The lookup table 34 can be programmable to implement a user-defined function. For example, the arctan function could be implemented using the lookup table 34, as one specific example. In another example, the user-defined function can be a decoder for a distribution function as described above, and the decoder can be implemented using values stored in the lookup table 34. In another example, the lookup table can be configured to implement block scaling, as described below. As some other examples, the lookup table can also be configured to implement a quantization function dequantization function, linearization function, normalization function, or trigonometric function, etc.

Figure 3:
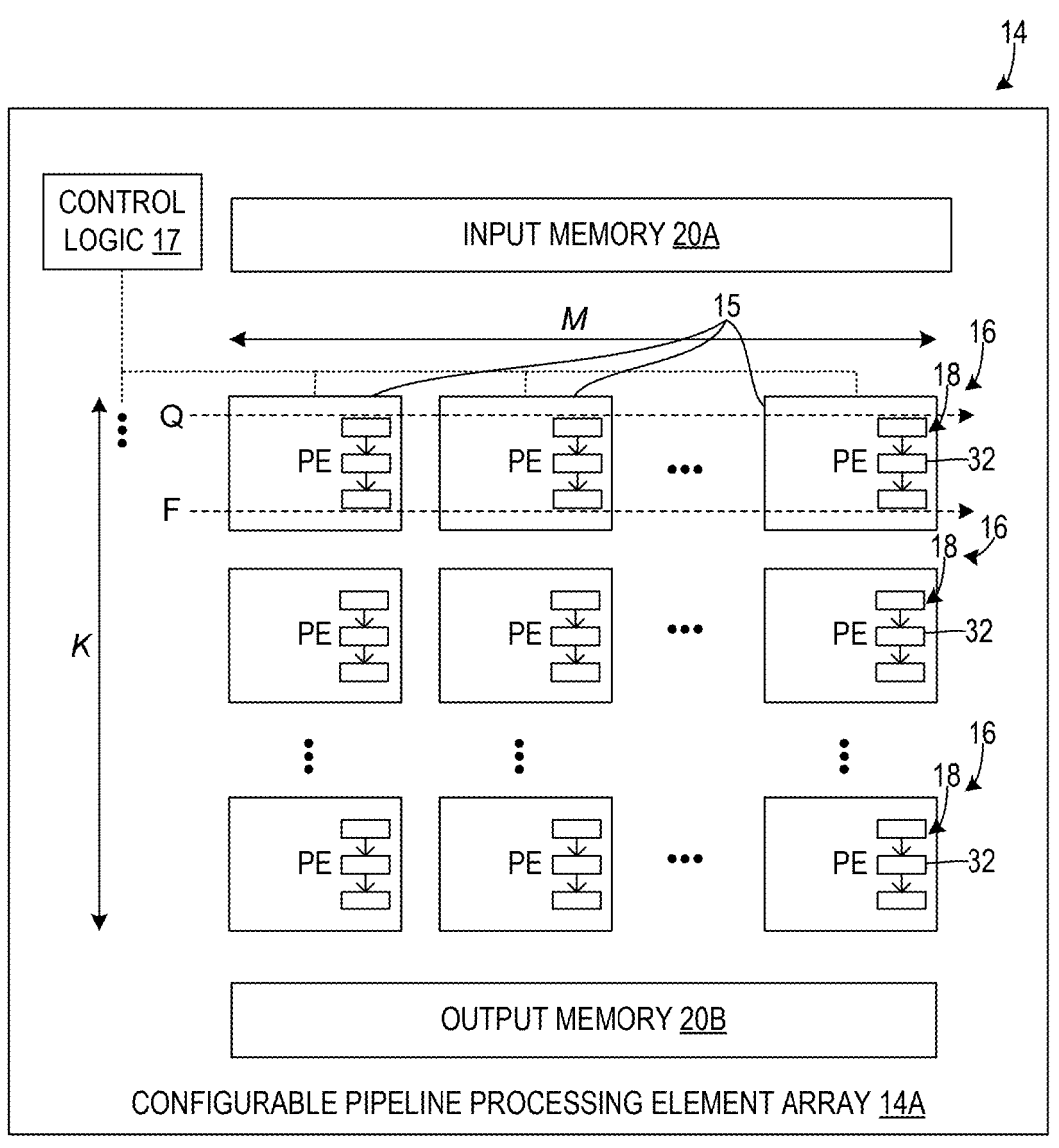
FIG. 3 illustrates an exemplary configurable pipeline processing element array in the hardware accelerator of the computing system of FIG. 1.

As shown in FIG. 3, the hardware accelerator 14 includes a plurality of processing elements 15 within the configurable pipeline processing element array 14A. These processing elements 15 are arranged in a grid on the hardware accelerator substrate, and are connected with the processor by a data bus, such as data bus 22 discussed above. Input memory 20A holds input to the processing element array 14A, while results are written to output memory 20B. In one specific example, the processing element array 14A includes 1024 processing elements arranged in a 32×32 array. The tensor operation logic units 16 are identically provided in each of the processing elements 15. Further, based on the pipeline command 24, identical tensor operation pipeline logic 18 for an identical tensor operation pipeline 32 is implemented within each of the processing elements 15, using control logic 17 for the processing element array 14A, which controls each of the processing elements 15.

Figure 4:
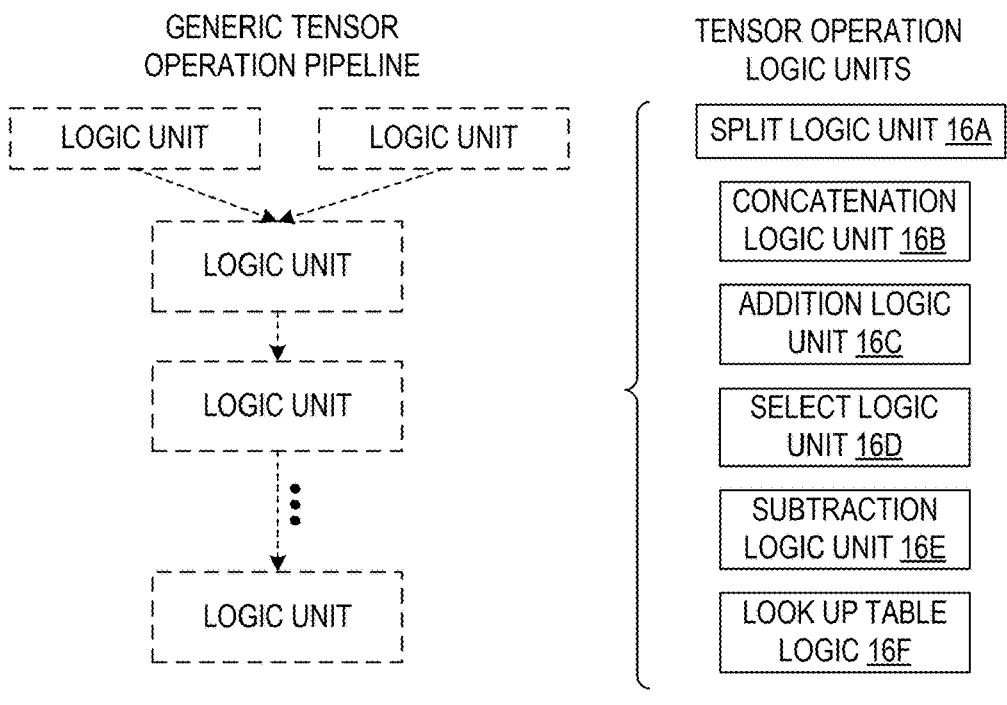
FIG. 4 shows a generic tensor operation pipeline and available tensor operation logic units that can be used to fill the generic tensor operation pipeline, for the hardware accelerator of the computing system of FIG. 1.

FIG. 4 shows a schematic illustration of a generic tensor operation pipeline 32 including a plurality of generic processing stages 30. FIG. 4 also illustrates that the tensor operation logic units 16 can be assigned to stages 30 on the tensor operation pipeline 32. The precise order of logic units 16 in tensor operation pipeline logic 18, and their branching and conditional structure, if any, is configurable by the software developer and defined in the tensor operation pipeline definition 26 discussed above. However, the as the tensor operation logic units 16 are physically laid out in hardware in each processing unit, their layout is fixed. Thus, it will be appreciated that the flexibility afforded by the present approach will be constrained to a scope of functionality that is possible with the underlying hardware.

Figure 5:
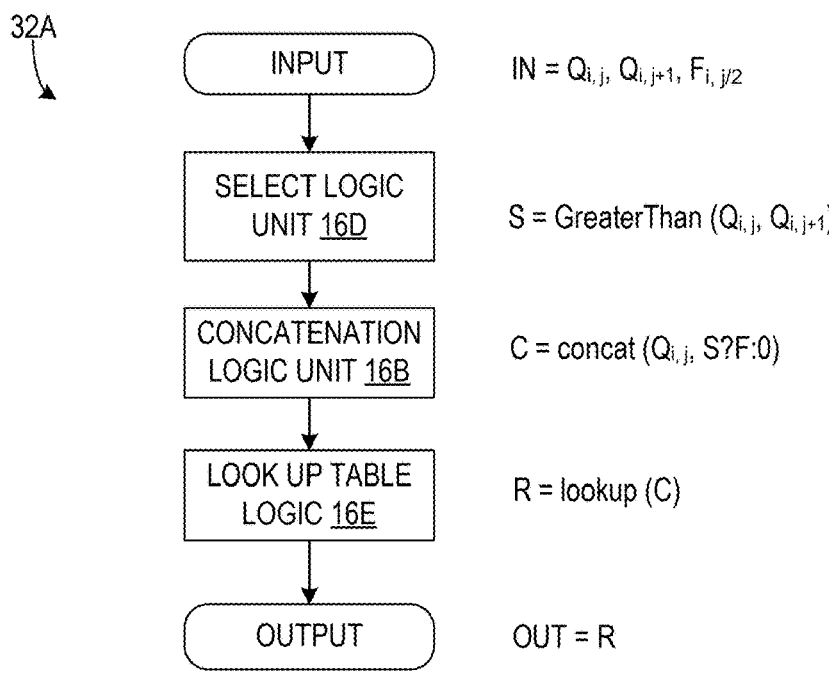
FIG. 5 illustrates an exemplary tensor operation pipeline configured from the generic tensor operation pipeline logic and available tensor operation logic units in FIG. 4.

FIG. 5 illustrates an example tensor operation pipeline 32A, including a flow that utilizes a select logic unit in a first stage, a concatenation logic unit in a second stage, and a lookup table in a third stage. The following pseudocode can serve as the tensor operation pipeline definition 26A used to implement the example tensor operation pipeline 32A.

```
Q: [32, 32] uint4
F: [32, 16] uint1
    At even (i.e., j % 2==0) PE,
        If (Q[i, j] > Q[i, j+1]
            X[i, j] = LUT (concat(Q[i, j], F[i][j/2])
            Else X[i, j] = LUT (concat(Q[i, j], 0)
    At odd (i.e., j % 2 != 0) PE,
        If !(Q[i, j−1] > Q[i, j]
```

-continued

```
X[i, j] = LUT (concat(Q[i, j], F[i][j/2])
Else X[i, j] = LUT (concat(Q[i, j], 0)
```

Figure 6:
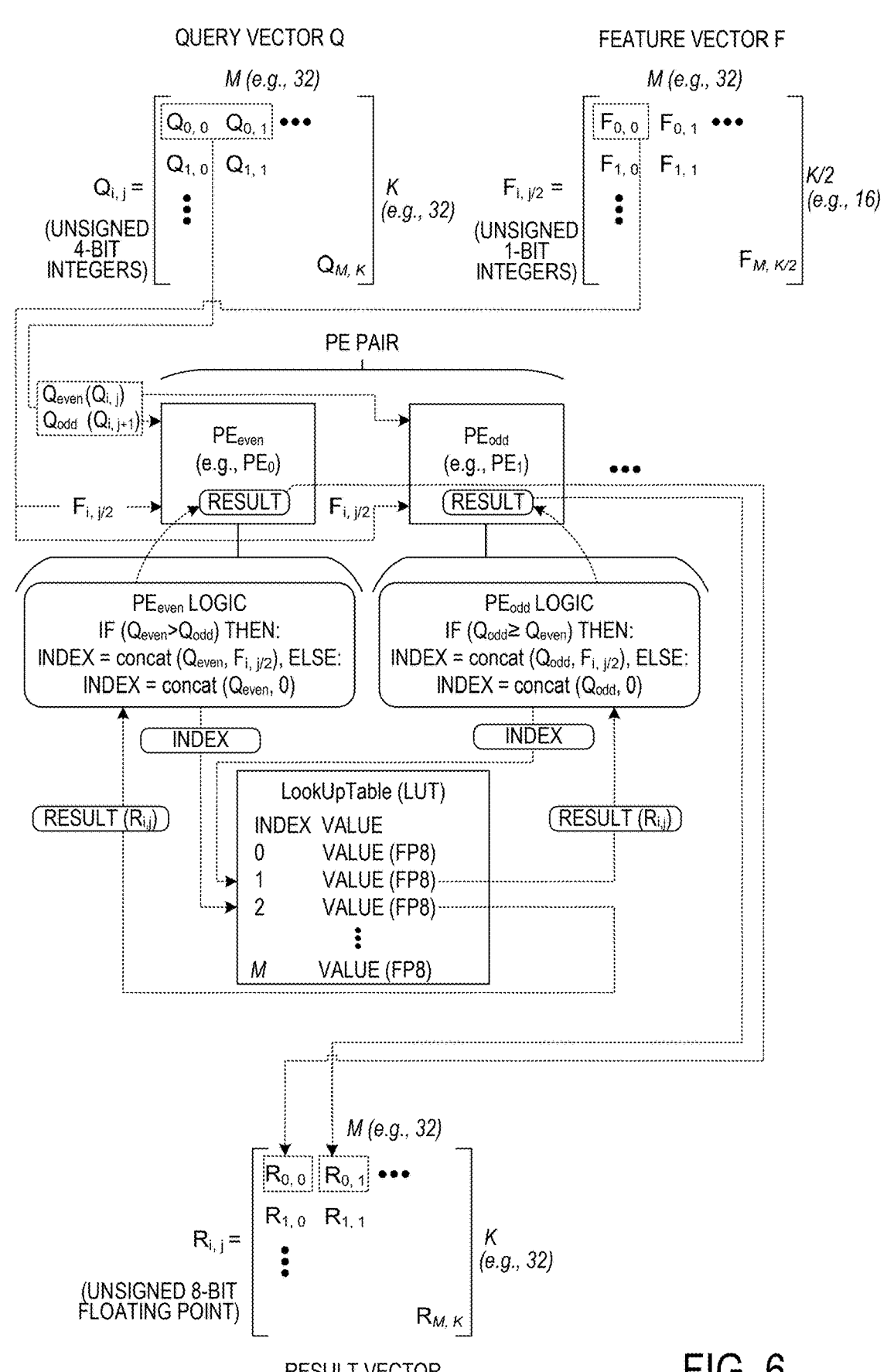
FIG. 6 illustrates an implementation of the hardware accelerator of the computing system of FIG. 1, with tensor operation logic units configured to utilize a lookup table to retrieve values.

FIG. 6 is a graphical illustration of how the pseudocode listed above can be executed to implement the example tensor operation pipeline 32A of FIG. 5. operating on a query vector (query tensor) and a feature vector (feature tensor). Example tensor operation pipeline 32A receives, as input, tensor data 28 including a Query vector Q and a Feature vector F. Q is M×K in size, while F is M×K/2 in size. The elements of Q, i.e. Q[i, j], are unsigned 4-bit integers, while the elements of F, i.e. F[i, j], are unsigned 1 bit integers. The tensor processing pipeline definition 26 for tensor operating pipeline 32A instructs the tensor operating pipeline logic 18 to read data (including $Q_{even}$, $Q_{odd}$, and $F_{i,j/2}$) from the input vectors Q and F and send the data to each processing element in a processing element pair including an even numbered processing element $PE_{even}$ and an odd numbered processing element $PE_{odd}$. $P_{Eeven}$ is programmed with the following logic described above: If $(Q_{even} > Q_{odd})$ Then: index=concat $(Q_{even}, F_{i,j/2})$, Else: index=concat $(Q_{even}, 0)$. On the other hand, $PE_{odd}$ is programmed with the following logic described above: If $(Q_{odd} \geq Q_{even})$ Then: index=concat $(Q_{odd}, F_{i,j/2})$, Else: index=concat $(Q_{odd}, 0)$. In this manner the even processing element $P_{even}$ and the odd processing element $P_{odd}$ each generate an index. The index is used to lookup in the user-programmed lookup table (LUT) 34 an associated lookup value. In the depicted example, the lookup table has M entries, where M=32. The values in the lookup table are formatted in eight bit floating point format (FP8). The lookup result values $R_{i,j}$ corresponding to each index are returned to the requesting processing elements $PE_{even}$ and $PE_{odd}$, which in turn store them in a matrix, referred to as the result vector or result tensor, which has format $R_{M, K}$ and is populated with FP8 values retrieved from the lookup table. After all processing elements 15 are called by the tensor processing pipeline 32A, the result vector is fully populated with results, and returned to the processor 12 as the output of the tensor processing operation. These results can represent the update weights and activation values, in the example discussed above.

Figure 7:
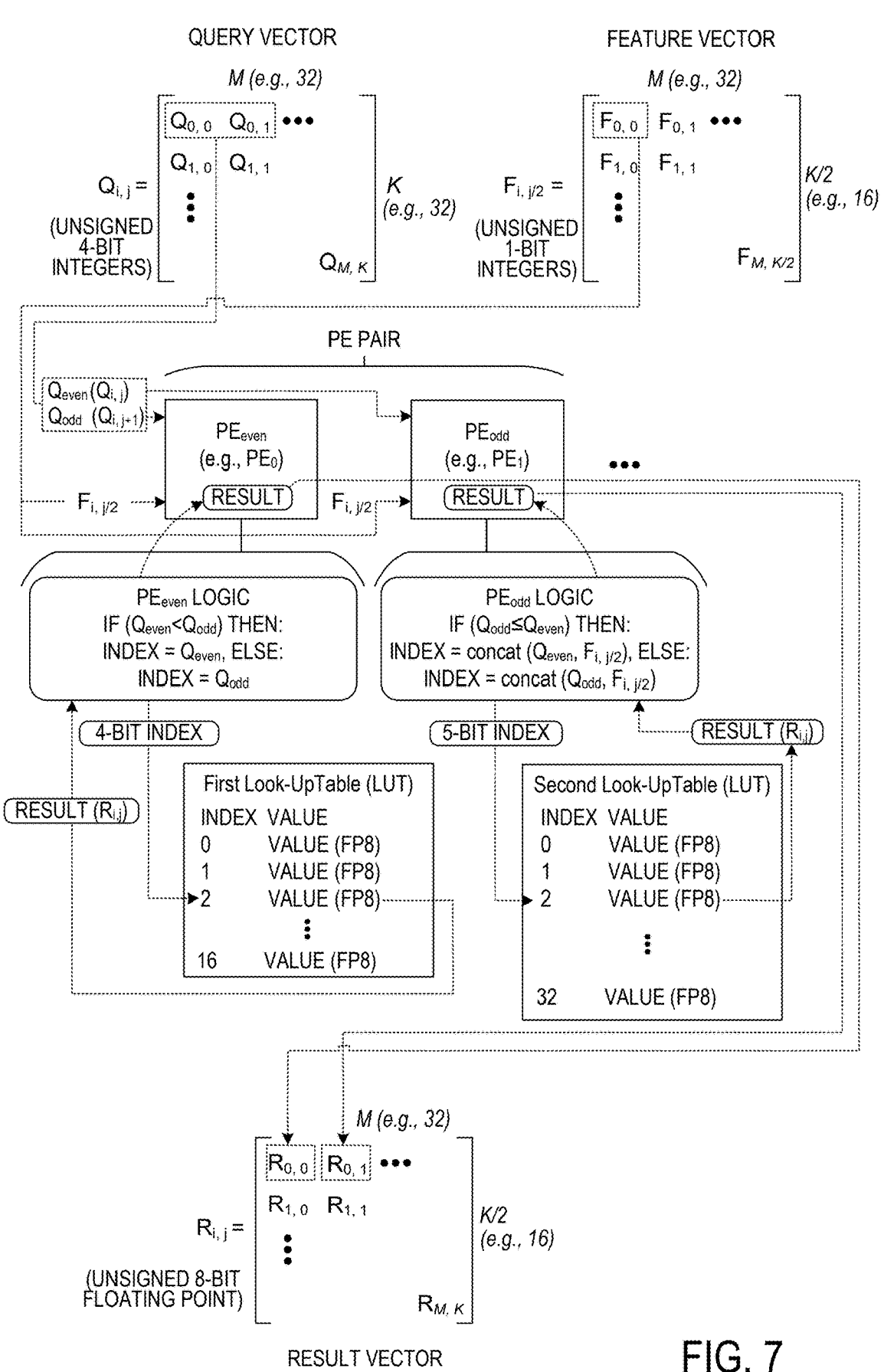
FIG. 7 illustrates an implementation of the hardware accelerator of the computing system of FIG. 1, with tensor operation logic units configured to utilize two lookup tables to retrieve values.

It will be appreciated that the implementation of FIG. 6 requires a two port lookup table of M elements, and in the example M=32. FIG. 7 illustrates an alternative implementation of the tensor pipeline operation 32A, which is implemented using a first lookup table of that has only one input port and is K/2 (16 rows in this example) in length, and a second lookup table where M=32. Like the example of FIG. 6, to perform the tensor operation on the Query vector Q and Feature vector F, each pair of processing elements $P_{even}$ and $P_{odd}$ retrieves a respective $Q_{even}$, $Q_{odd}$, and $F_{i,j/2}$ from the Query vector and Feature vector as inputs. Accordingly, a 4-bit index is used by the even processing element $PE_{even}$ to lookup values in the first lookup table, and a 5 bit index is used by $PE_{odd}$ to lookup values in the second lookup table. $PE_{even}$ applies the following logic to compute the index for the first lookup table: If $(Q_{even} > Q_{odd})$ Then: Index=$Q_{even}$, Else: Index=$Q_{odd}$. $PE_{odd}$ applies the following logic to compute the index for the second lookup table: If $(Q_{odd} \leq Q_{even})$ Then: index=concat$(Q_{even}, F_{i,j/2})$, Else: index=concat$(Q_{odd}, F_{i,j/2})$. The even processing element $P_{even}$ of sends a lookup request with the calculated 4-bit index to the first lookup table, which returns a lookup result stored at the index. The odd processing element $P_{odd}$ sends a lookup request using the 5-bit index to the second lookup table, which results a lookup result stored at the index. These results are unsigned 8 bit floating point (FP8) numbers, and are returned to be written in the result vector. Once all of the pairs of processing elements have retrieved the results for all entries in the result vector, the result vector is output to the processor 12. The configuration of FIG. 7 has the advantage of being more accurate in its coding, and also potentially is more area efficient, since two one-port lookup tables of length M and M/2 can require less area to implement than one two-port look-up table of length M.

In an alternative implementation, the lookup table can be shared among many pairs of PEs, with 2*K ports, where K is the number of pairs of PEs. For example, a single lookup table can be shared between 128 pairs of PEs, and provided with 256 ports to accommodate the sharing. Further, the implementation of such a shared lookup table with (in this example) 256 ports could involve duplicating the lookup table a number of times with identical contents and reducing the number of ports per look up table. For example, 32 instances of a 32-port lookup table could be used, and would accommodate sharing among multiple PEs the same as a single 256-port LUT.

FIG. 8 illustrates a flowchart of a computerized method 100 according to one implementation of the present disclosure. Method 100 can be implemented using the computing system 10 described above, or using other suitable components. Method 100 includes a plurality of steps that are performed at a hardware accelerator equipped with fixed tensor operation logic units and being in communication with a processor of a computing system. At 102, the method includes receiving from the processor a pipeline command including a software-defined tensor operation pipeline definition defining a plurality of tensor operation stages in a tensor operation pipeline and associated predetermined tensor operations to be performed at each of the defined tensor operation stages.

At 104, the method includes receiving tensor data to be computed by the tensor operation pipeline. As shown at 106, the tensor data can include numerical parameters of a neural network. As shown at 108, those numerical parameters can be in the form of a query vector and feature vector, for example. In other examples, the numerical parameters can be weights and activation function values, for example. Typically these inputs come in the form of an operand and an operator pair, such as an operator matrix and an operand matrix. The matrices may be blocks from larger matrices, which are sent for processing to the processing elements. In one example shown at 110, the values in the matrices may be floating point values having mantissa bits and exponent bits.

At 112, the method includes implementing the tensor operation pipeline to perform the tensor operations in each of the tensor operation stages on the tensor data using the plurality of fixed tensor operation logic units, to thereby produce a tensor operation pipeline result for the tensor data. As shown at 114, the tensor operations can include split, add, subtract, select, concatenate, and perform a lookup to a lookup table. The lookup table can be programmable to implement a user-defined function, such as block scaling, decoding distribution encoding, quantization, dequantization, normalization, etc. When the tensor data includes floating point values, the split function can be configured to split the floating point values into constituent mantissa and exponent portions. The concatenate function can be used to concatenate mantissas and/or exponents and/or signs of floating point numbers. The split can be programmable, in one implementation. The subtraction and addition functions include the ability to subtract or add two floating point numbers. The select function can select between two values according to a selection criterion or condition. The lookup table can be of a suitable size, such as a 16, 32, 64, 128, 256 or 512 rows, each of which stores an 8 bit number.

Finally, at 116, the method includes outputting the tensor operation pipeline result. The tensor operation pipeline result may be output to a tensor arithmetic unit, to the processor, to memory or storage, or even to another instance of the tensor operation pipeline, for example.

FIG. 9 illustrates a computing method 200 according to another example implementation of the present disclosure. Method 200 can be implemented using the computing system 10 described above, or using other suitable components. Method 200 includes a plurality of steps that are performed at a hardware accelerator that is in communication with a processor of a computing system. Computing method 200 includes, at 202, receiving a tensor operation pipeline definition and tensor data from a processor, at a configurable pipeline processing element array of a hardware accelerator. As shown at 204, the configurable plurality of fixed tensor operation logic units can be selected from the group consisting of a split logic unit, add logic unit, subtract logic unit, select logic unit, concatenate logic unit, and lookup logic unit. As shown at 206, the tensor operation pipeline definition defines a plurality of stages, each stage specifying a corresponding one of the configurable plurality of fixed tensor operation logic units. In some implementations, at least one of the stages includes a look up table logic unit as the fixed tensor operation logic unit for that stage, and as shown at 208, values for the look up table unit are included in the tensor operation pipeline definition.

The stages can be in a predetermined order defined by an on-chip hardware layout that is identical for all processing elements, and individual fixed tensor operation logic units can be turned on or off by command. The turning on and off can be implemented by no operation commands as described below. This, coupled with the look up table values, provides great flexibility to the pipeline.

At 210, the method includes, in each of a plurality of processing elements of the array, processing the tensor data by implementing a configurable tensor operation pipeline including one or more of the fixed tensor operation logic units according to the tensor operation pipeline definition. At 212, the method includes outputting a tensor operation pipeline result based on the processing of the tensor data by each tensor operation pipeline in each processing element.

The tensor operation pipeline can be programmed to realize a variety of functions. For example, the tensor data can be encoded with a distribution encoding, and the tensor operation pipeline decodes the distribution encoding. Further, the tensor operation pipeline can be configured to perform block scaling on the tensor data. In addition, the tensor operation pipeline can be configured to reduce the precision of the tensor data or increase the precision of the tensor data, that is, can implement quantization or dequantization.

In performing method 200, it will be understood that the tensor operation logic units that form the tensor operation pipeline are separate from a tensor arithmetic unit of the hardware accelerator, such as a dedicated systolic array for matrix multiplication, for example. The tensor operation pipeline result can be passed directly back to the processor, or in some use cases, the tensor operation pipeline result is passed to the tensor arithmetic unit for further on-chip processing prior to outputting the tensor operation pipeline result.

FIG. 10A illustrates another example tensor operation pipeline 34B having 10 stages constructed of an ordering of tensor operation logic units 16, the first two stages being executed in parallel. Tensor operation pipeline 34B can be useful in flexibly handling tensor data 28 in a variety of formats and encodings. The split logic unit 16A can be programmed to perform a split operation on an incoming 8 bit number, such as an FP8 format number. For example, the number may be split into three bits of exponent, and 5 bits of mantissa, or 2 bits of exponent and six bits of mantissa, as two examples. After splitting, the mantissas of two operands can be combined together in a concatenation operation, and that concatenated value can be used as an index into a lookup table. The lookup table itself can be programmed to implement a variety of functions, as described above.

FIG. 10B illustrates that when a pipeline such as pipeline 34B is hardcoded into the logic of each processing element 15 in the processing element array 14A of the hardware accelerator 14, then no operation (NOP) opcodes can be used to turn off certain logic units during computation. Accordingly, the dashed boxes of tensor operation pipeline 34C in FIG. 10B represent logic units that have been turned off using NOP commands, while the solid lines represent boxes that remain active. It will be appreciated that the tensor operation pipeline 34C shows how such NOP commands can be used to implement a pipeline similar in function to tensor operation pipeline 34A of FIG. 5, as the two pipelines are functionally equivalent.

Figure 10C:
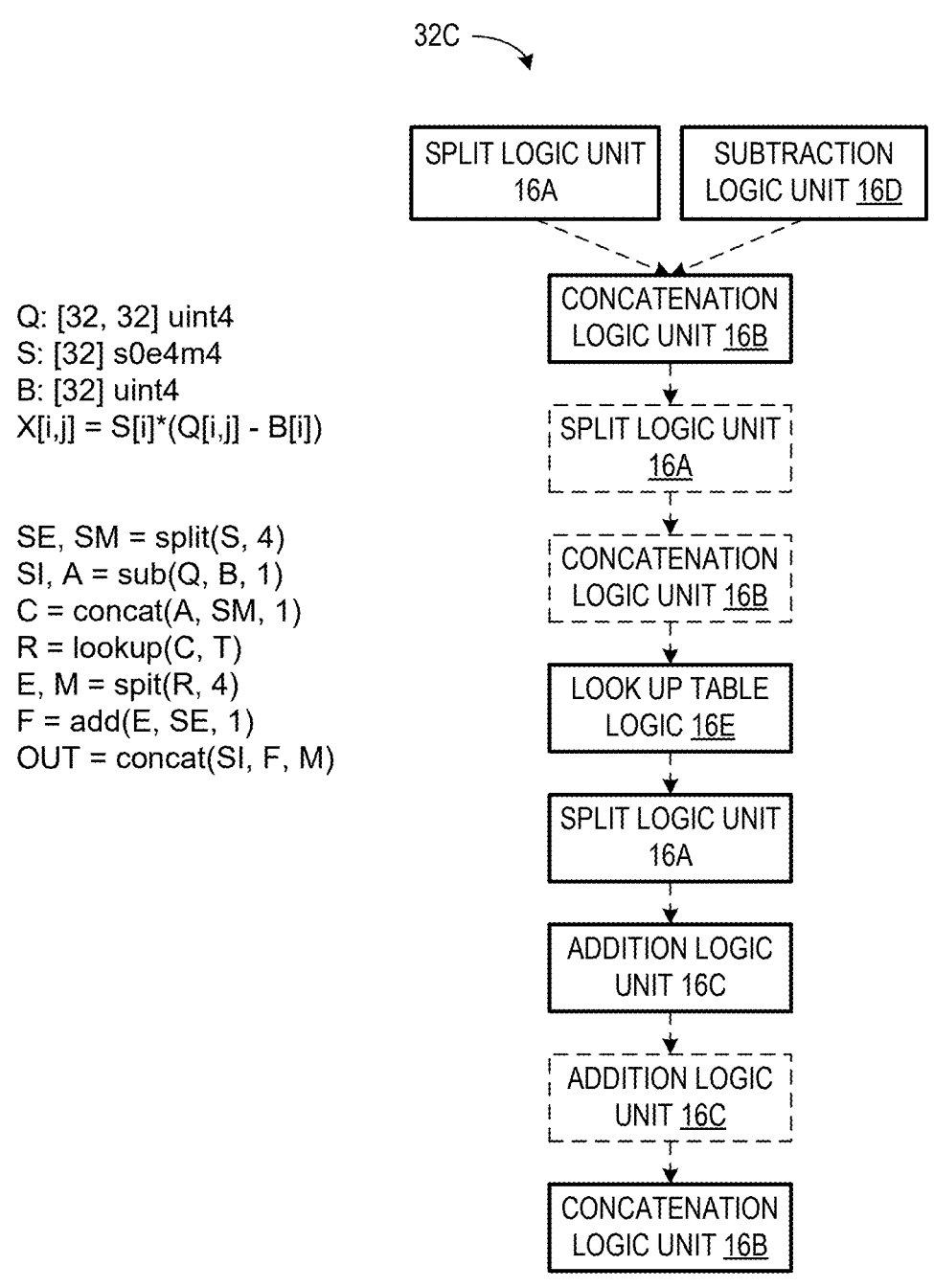
FIG. 10C illustrates an example tensor operation pipeline that the hardware accelerator of the computing system of FIG. 1 can implement to achieve block scaling.
Figure 11:
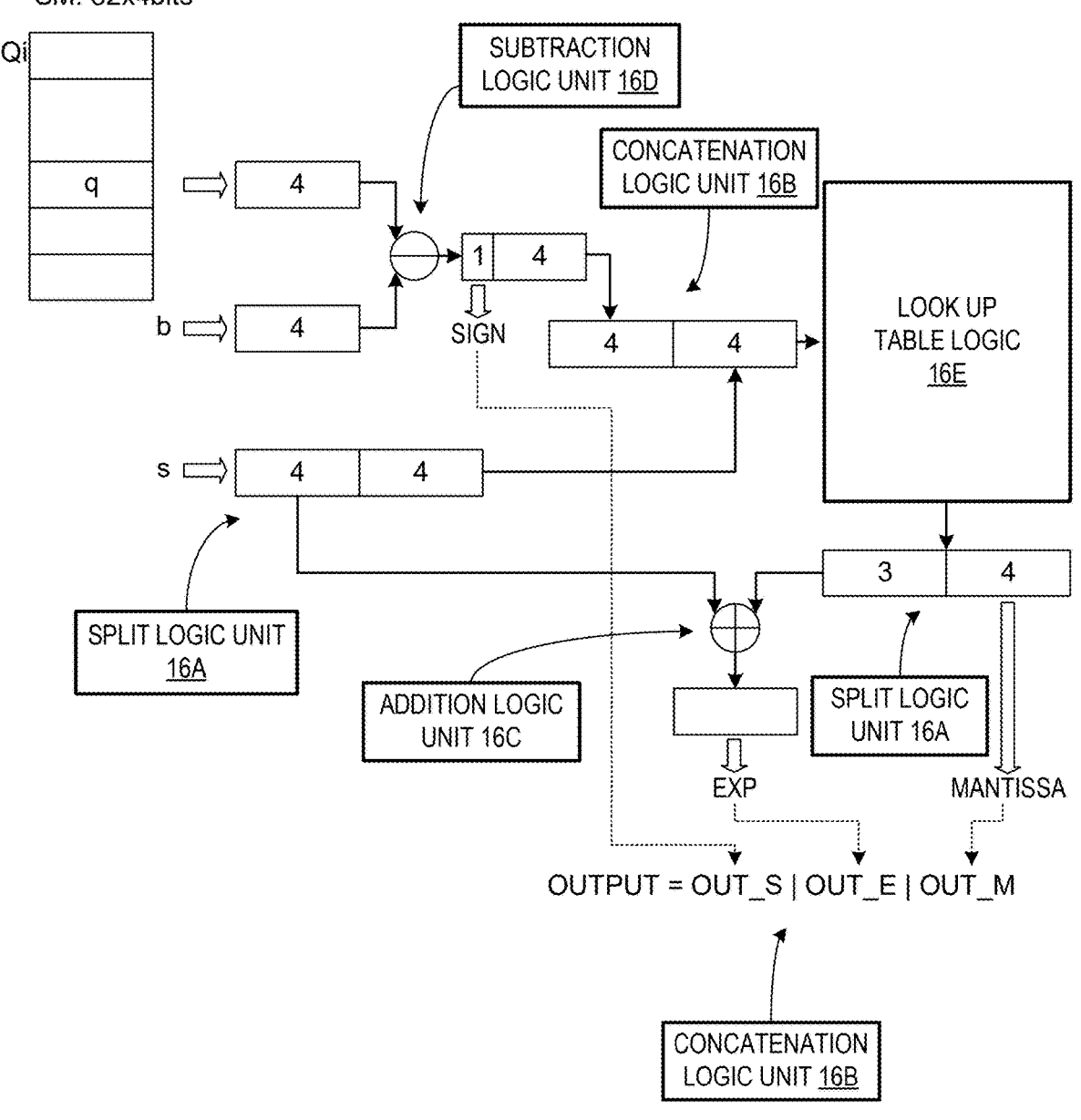
FIG. 11 illustrates a hardware schematic view of the block scaling implemented by the pipeline of FIG. 10C.

FIG. 10C illustrates a pipeline 34C configured to perform block scaling on inputs. Dashed logic units are turned off in this example through NOP (no operation) opcodes. FIG. 11 also illustrates this procedure, by way of a hardware schematic view. Block scaling is a type of quantization algorithm. In block scaling, each block of values (in one example, there could be 32 values in a block) are quantized through a shared scale and bias. An expression for block scaling follows.

$$q = \text{round}((t + \text{bias})/\text{scale})$$

Referring to FIGS. 10C and 11, an example implementation of the blocking scaling algorithm according to the present disclosure can be achieved by utilizing pipeline 34C as follows. In the example implementation, input data is received by the pipeline 34C having the following form: Q: 32×32×4 bits, B: 32×4 bits; SE: 32×4 bits; SM: 32×4 bits. Index formation can proceed as follows. The scaling can be performed by row scaling, as follows:

1. For each i, j let out_s|m=Q(i, j)−B(i), where Q(i, j), B(i) are treated as uint4 values, out_s is the sign bit, and m is a 4-bit value.
2. Output m|SM(i) (in total 8-bits) as the index.

As shown, pipeline 34C includes a split logic unit 16A and subtraction logic unit 16D on the input side, which pass data to concatenation logic unit 16B. A first bit of the output of the subtraction logic unit 16D is output as the sign. Four remaining bits are passed to the concatenation logic unit 16B. The split logic unit 16A splits its input into a first four bits and a second four bits, with the first four bits being passed to addition logic unit 16C and the second four bits being passed to the concatenation logic unit 16B. The output of the concatenation logic unit 16B is sent to the look up table logic 16E.

The look up table 16E is a 256 entry look up table in this example, with each entry being an 8-bit value (only 7-bits are used as unsigned E4M3 values). The look up table may be specified by the machine learning program 13 described above. Smaller size lookup tables may also be used, if desired.

Output transformation proceeds as follows. The output of the look up table logic 16E is sent to a second split logic unit 16A. The output of the lookup table consists of 7 bits, denoted by e|out_m, where e is 4 bits and out_m is 3 bits, representing unsigned E4M3 value. Further, out_e=e+SE(i). The split logic unit 16A sends mantissa bits straight to the concatenation logic unit 16B for output, and sends 3 bits to the addition logic unit 16C, to be added with the first four bits from the split logic unit 16A on the input side. The final output of the dequantized value produced by the concatenation logic unit 16B consists of out_s|out_e|out_m. The above computation computes Q(i, j)−B(i)*S(i) where S(i) is an unsigned floating point value with exponent SE(i) and mantissa SM(i). In this way, block scaling can be efficiently implemented by a specific configuration of the pipeline 34C.

The techniques described herein enable the hardware accelerator to be flexibly configured to accommodate a wide variety of tensor data formats and encodings for its inputs and outputs, thereby reducing the data storage and transmission bandwidth requirements for the tensor operations performed on a given AI model, while also providing the flexibility of not requiring a predetermined format. This is achieved by programming the hardware accelerator using the pipeline command with the tensor operator pipeline definition command that enables the inputs and outputs to be processed according to the developer's goals. This flexible processing functionality can be used to implement block scaling, decoding of distribution encoding, application of trigonometric functions, quantization and dequantization, etc. Hardware implementations of such tensor operations can save compute resources as compared to performing the same operations in software.

The flexibility provided by the configurable pipelines described herein offer the technical benefit of enabling hardware accelerator to be flexibly configured to adapt to evolving data formats and data science techniques used in machine learning training and inference. In this way, hardware that was designed years before a particular data science technique was adopted can still be flexibly configured to efficiently perform computations according to the latest approach.

Figure 12:
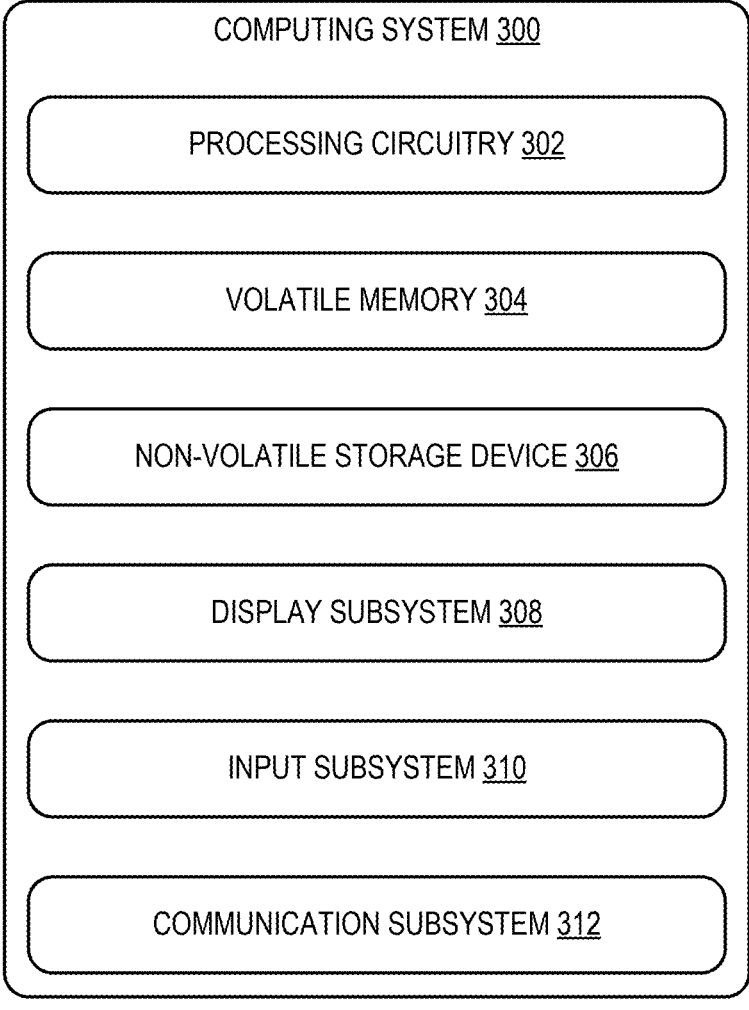
FIG. 12 shows a schematic view of an example computing environment in which the computing system of FIG. 1 may be enacted.

FIG. 12 schematically shows a non-limiting embodiment of a computing system 300 that can enact one or more of the methods and processes described above. Computing system 300 is shown in simplified form. Computing system 300 may embody the computing system 10 described above and illustrated in FIG. 1. Components of computing system 300 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 300 includes processing circuitry 302, volatile memory 304, and a non-volatile storage device 306. Computing system 300 may optionally include a display subsystem 308, input subsystem 310, communication subsystem 312, and/or other components.

Processing circuitry 302 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 302 may be single-core or multi-core, and the instructions executed thereon may be configured for sequential, parallel, and/or distributed processing. Individual components of the processing circuitry 302 optionally may be distributed among two or more separate devices, which may be remotely located and/or configured for coordinated processing. For example, aspects of the computing system 300 disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 302.

Non-volatile storage device 306 includes one or more physical devices configured to hold instructions executable by the processing circuitry to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by processing circuitry 302 to temporarily store information during processing of software instructions. It will be appreciated that volatile memory 304 typically does not continue to store instructions when power is cut to the volatile memory 304.

Aspects of processing circuitry 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via processing circuitry 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device 306, and thus transform the state of the non-volatile storage device 306, the state of display subsystem 308 may likewise be transformed to visually represent changes in the underlying data. Display subsystem 308 may include one or more display devices utilizing virtually any type of technology. Such display devices may be combined with processing circuitry 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem 312 may be configured for communication via a wired or wireless local- or wide-area network, broadband cellular network, etc. In some embodiments, the communication subsystem 312 may allow computing system 300 to send and/or receive messages to and/or from other devices via a network such as the Internet.

The following paragraphs disclose example aspects of the present disclosure. A hardware accelerator for use with a processor of a computing system is provided, comprising: a configurable pipeline processing element array including a plurality of processing elements, each processing element including a plurality of fixed tensor operation logic units, the configurable pipeline processing element array being configured to receive a tensor operation pipeline definition and tensor data from a processor, wherein each processing element is configured to process the tensor data by implementing a configurable tensor operation pipeline including one or more of the fixed tensor operation logic units according to the tensor operation pipeline definition, and the configurable pipeline processing element array is configured to output a tensor operation pipeline result based on the processing of the tensor data by each tensor operation pipeline in each processing element. In this aspect, the configurable plurality of fixed tensor operation logic units can be selected from the group consisting of a split logic unit, add logic unit, subtract logic unit, select logic unit, concatenate logic unit, and lookup logic unit. In this aspect, the tensor operation pipeline definition can define a plurality of stages, each stage specifying a corresponding one of the configurable plurality of fixed tensor operation logic units;

the stages can be in a predetermined order defined by an on-chip hardware layout, and individual fixed tensor operation logic units can be turned on or off by command; and at least one of the stages can include a look up table logic unit as the fixed tensor operation logic unit for that stage. In this aspect, the tensor data can be encoded with a distribution encoding, and the tensor operation pipeline can decode the distribution encoding. In this aspect, the tensor operation pipeline can perform block scaling on the tensor data. In this aspect, the tensor operation logic units that form the tensor operation pipeline can be separate from a tensor arithmetic unit of the hardware accelerator. In this aspect, the tensor operation pipeline result can be passed to the tensor arithmetic unit for further on-chip processing prior to outputting the tensor operation pipeline result.

According to another aspect, a hardware accelerator for use with a processor of a computing system is provided, comprising: a plurality of fixed tensor operation logic units configured to perform a plurality of predetermined types of tensor operations; and tensor operation pipeline logic configured to: receive from the processor a pipeline command including a software-defined tensor operation pipeline definition defining a plurality of tensor operation stages in a tensor operation pipeline and associated predetermined tensor operations to be performed at each of the defined tensor operation stages, receive tensor data to be computed by the tensor operation pipeline, and implement the tensor operation pipeline to perform the tensor operations in each of the tensor operation stages on the tensor data, to thereby produce a tensor operation pipeline result for the tensor data, and output the tensor operation pipeline result to the processor. In this aspect, the tensor data can include numerical parameters of a neural network. In this aspect, the numerical parameters of the neural network can be floating point values including one or more mantissa bits and one or more exponent bits. In this aspect, the predetermined types of tensor operations can be selected from the group consisting of split, add, subtract, select, concatenate, and perform a lookup to a lookup table. In this aspect, the lookup table can be programmable to implement a user-defined function. In this aspect, the user-defined function can be a block scaling or a decoding a distribution encoding of tensor data. In this aspect, the tensor data can include floating point values and the split function can split floating point values into constituent mantissa and exponent portions.

According to another aspect, a computing system is provided, comprising: a processor; and a hardware accelerator communicatively coupled to the processor, the hardware accelerator including a plurality of fixed tensor operation units configured to perform a plurality of predetermined types of tensor operations, wherein the hardware accelerator is configured to receive from the processor a pipeline command including a software-defined tensor operation pipeline definition defining a plurality of tensor operation stages in a tensor operation pipeline and associated predetermined tensor operations to be performed at each of the defined tensor operation stages, the hardware accelerator is further configured to receive tensor data to be computed by the tensor operation pipeline, and in response to receiving the tensor pipeline command and the tensor data, the hardware accelerator is configured to implement the tensor operation pipeline to perform the tensor operations in each of the tensor operation stages on the tensor data, to thereby produce a tensor operation pipeline result for the tensor data, and output the tensor operation pipeline result to the processor. In this aspect, the tensor data can include numerical parameters of a neural network. In this aspect, the numerical parameters of the neural network can be floating point values including one or more mantissa bits and one or more exponent bits. In this aspect, the tensor operations can be selected from the group consisting of split, add, subtract, select, concatenate, and perform a lookup to a lookup table. In this aspect, the tensor operations can include the look up table, and the lookup table can be programmable to implement a user-defined function. In this aspect, the tensor data can include floating point values and the split function can split floating point values into constituent mantissa and exponent portions.

"And/or" as used herein is defined as the inclusive or $\lor$, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hardware accelerator for use with a processor of a computing system, comprising:

a configurable pipeline processing element array including a plurality of processing elements, each processing element including a configurable plurality of fixed tensor operation logic units, the configurable pipeline processing element array being configured to receive a tensor operation pipeline definition and tensor data from the processor, wherein each processing element is configured to process the tensor data by implementing a configurable tensor operation pipeline including one or more of the fixed tensor operation logic units according to the tensor operation pipeline definition;

the tensor operation pipeline definition defines a plurality of stages, each stage specifying a corresponding one of the configurable plurality of fixed tensor operation logic units;

the stages are in a predetermined order defined by an on-chip hardware layout, and individual fixed tensor operation logic units can be turned on or off by command;

at least one of the stages includes a lookup table logic unit as the fixed tensor operation logic unit for that stage; and the configurable pipeline processing element array is configured to output a tensor operation pipeline result based on the processing of the tensor data by each tensor operation pipeline in each processing element.

2. The hardware accelerator of claim 1, wherein the configurable plurality of fixed tensor operation logic units are selected from the group consisting of a split logic unit, add logic unit, subtract logic unit, select logic unit, concatenate logic unit, and the lookup table logic unit.

3. The hardware accelerator of claim 1, wherein the tensor data is encoded with a distribution encoding, and the tensor operation pipeline decodes the distribution encoding.

4. The hardware accelerator of claim 1, wherein the tensor operation pipeline performs block scaling on the tensor data.

5. The hardware accelerator of claim 1, wherein the tensor operation logic units that form the tensor operation pipeline are separate from a tensor arithmetic unit of the hardware accelerator.

6. The hardware accelerator of claim 5, wherein the tensor operation pipeline result is passed to the tensor arithmetic unit for further on-chip processing prior to outputting the tensor operation pipeline result.

7. A hardware accelerator for use with a processor of a computing system, comprising:

a configurable plurality of fixed tensor operation logic units configured to perform a plurality of predetermined types of tensor operations; and tensor operation pipeline logic configured to:

receive from the processor a pipeline command including a software-defined tensor operation pipeline definition defining a plurality of tensor operation stages in a tensor operation pipeline and associated predetermined tensor operations to be performed at each of the defined tensor operation stages, wherein:

each of the tensor operation stages specifies a corresponding one of the configurable plurality of fixed tensor operation logic units;

the tensor operation stages are in a predetermined order defined by an on-chip hardware layout, and individual fixed tensor operation logic units can be turned on or off by command; and at least one of the tensor operation stages includes a lookup table logic unit as the fixed tensor operation logic unit for that tensor operation stage;

receive tensor data to be computed by the tensor operation pipeline, and implement the tensor operation pipeline to perform the tensor operations in each of the tensor operation stages on the tensor data, to thereby produce a tensor operation pipeline result for the tensor data, and output the tensor operation pipeline result to the processor.

8. The hardware accelerator of claim 7, wherein the tensor data includes numerical parameters of a neural network.

9. The hardware accelerator of claim 8, wherein the numerical parameters of the neural network are floating point values including one or more mantissa bits and one or more exponent bits.

10. The hardware accelerator of claim 7, wherein the predetermined types of tensor operations are selected from the group consisting of split, add, subtract, select, concatenate, and perform a lookup to a lookup table.

11. The hardware accelerator of claim 10, wherein the lookup table is programmable to implement a user-defined function.

12. The hardware accelerator of claim 11, wherein the user-defined function is block scaling or decoding a distribution encoding of the tensor data.

13. The hardware accelerator of claim 10, wherein the tensor data includes floating point values and the split function splits floating point values into constituent mantissa and exponent portions.

14. A computing system comprising:

a processor, and a hardware accelerator communicatively coupled to the processor, the hardware accelerator including a configurable plurality of fixed tensor operation units configured to perform a plurality of predetermined types of tensor operations, wherein the hardware accelerator is configured to receive from the processor a pipeline command including a software-defined tensor operation pipeline definition defining a plurality of tensor operation stages in a tensor operation pipeline and associated predetermined tensor operations to be performed at each of the defined tensor operation stages, each of the tensor operation stages specifies a corresponding one of the configurable plurality of fixed tensor operation logic units, the tensor operation stages are in a predetermined order defined by an on-chip hardware layout, and individual fixed tensor operation logic units can be turned on or off by command, at least one of the tensor operation stages includes a lookup table logic unit as the fixed tensor operation logic unit for that tensor operation stage, the hardware accelerator is further configured to receive tensor data to be computed by the tensor operation pipeline, and in response to receiving the tensor pipeline command and the tensor data, the hardware accelerator is configured to implement the tensor operation pipeline to perform the tensor operations in each of the tensor operation stages on the tensor data, to thereby produce a tensor operation pipeline result for the tensor data, and output the tensor operation pipeline result to the processor.

15. The computing system of claim 14, wherein the tensor data includes numerical parameters of a neural network.

16. The computing system of claim 15, wherein the numerical parameters of the neural network are floating point values including one or more mantissa bits and one or more exponent bits.

17. The computing system of claim 14, wherein the tensor operations are selected from the group consisting of split, add, subtract, select, concatenate, and perform a lookup to a lookup table.

18. The computing system of claim 17, wherein the tensor operations include the lookup table, and the lookup table is programmable to implement a user-defined function.

19. The computing system of claim 17, wherein the tensor data includes floating point values and the split function splits floating point values into constituent mantissa and exponent portions.

* * * * *